United States Patent [19]

Fujioka et al.

[11] Patent Number: 4,837,491
[45] Date of Patent: Jun. 6, 1989

[54] MOTOR VELOCITY CONTROL APPARATUS

[75] Inventors: Yoshiki Fujioka, Higashiyamato; Mitsuhiko Hirota, Tokyo, both of Japan

[73] Assignee: Fanuc Ltd., Minamitsuru, Japan

[21] Appl. No.: 928,208

[22] PCT Filed: Feb. 20, 1986

[86] PCT No.: PCT/JP86/00078
§ 371 Date: Oct. 16, 1986
§ 102(e) Date: Oct. 16, 1986

[87] PCT Pub. No.: WO86/05044
PCT Pub. Date: Aug. 28, 1986

[30] Foreign Application Priority Data

Feb. 22, 1985 [JP] Japan .................................. 60-34112

[51] Int. Cl.$^4$ ............................................. G05B 11/32
[52] U.S. Cl. ....................................... 318/625; 318/51
[58] Field of Search ...................... 318/46, 47, 51, 625

[56] References Cited

U.S. PATENT DOCUMENTS

| 4,257,103 | 3/1981 | Suzuki et al. | 318/625 X |
| 4,297,624 | 10/1981 | Komiya | 318/625 X |
| 4,464,615 | 8/1984 | Rodi | 318/625 |
| 4,641,069 | 2/1987 | Fujioka et al. | 318/625 |
| 4,644,232 | 2/1987 | Nojiri et al. | 318/51 X |

FOREIGN PATENT DOCUMENTS

| 55-78307 | 6/1980 | Japan | 318/625 |
| 59-89592 | 5/1984 | Japan . | |
| 59-123489 | 7/1984 | Japan . | |

Primary Examiner—Bentsu Ro
Attorney, Agent, or Firm—Staas & Halsey

[57] ABSTRACT

A motor velocity control apparatus according to the present invention has at least one of the following is included with a servoamplifier: a current feedback gain changeover circuit; a velocity feedback gain changeover circuit; a velocity loop gain changeover circuit; a changeover circuit for a current loop amplitude and phase table storage circuit. Accordingly, the invention is well-suited for changeover control of a plurality of spindle motors of different ratings in a machine tool.

4 Claims, 3 Drawing Sheets $$\text{MAIN } b_1 = \left(1 + \frac{R_2}{R_1}\right)$$
$$\text{SUB } b_2 = \left(1 + \frac{R_2}{R_1 + R_3}\right)$$

MOTOR VELOCITY CONTROL APPARATUS

DESCRIPTION

Background of the Invention

This invention relates to a motor velocity control apparatus and, more particularly, to a motor velocity control apparatus used in a changeover control circuit of a spindle motor in a machine tool.

In machine tools, such as machining centers, a plurality of motors are employed. These motors ordinarily have different characteristics so that they can operate as high-output and low-output motors or as high-velocity and low-velocity motors, etc. However, since these motors perform differently on account of their output and velocity characteristics, each motor requires an exclusive servoamplifier for control. Moreover, in a case where one of the motors is used, there are many instances in which the other motors are at rest, so that control circuits of the servoamplifiers belonging to these motors also are at rest. Therefore, the cost of the equipment is high and the equipment is not utilized efficiently.

SUMMARY OF THE INVENTION

An object of the present invention is to lower the cost and raise the efficiency by utilization of a motor velocity control apparatus wherein the hardware for one servoamplifier is shared by each of the motors in an arrangement where a spindle, or the like, of a machine tool is driven and controlled by a plurality of motors which perform differently.

According to the present invention, there is provided a motor velocity control apparatus having a servoamplifier capable of controlling plural types of motors having different characteristics, the motor velocity control apparatus being characterized in that at least one of the following is included in the servoamplifier:
  (1) a current feedback gain changeover circuit;
  (2) a velocity feedback gain changeover circuit;
  (3) a velocity loop gain changeover circuit; and
  (4) a changeover circuit of a current loop amplitude and phase table storage circuit.

In accordance with the motor velocity control apparatus of the present invention, a single servoamplifier is adjusted so as to conform to the characteristic of each motor is changed over and connected when controlling a plurality of motors which differ in terms of characteristics and performance. The invention therefore has the following advantages:
  (1) an input command voltage can be normalized to a predetermined value (e.g. 10 V);
  (2) the output of a speedometer can be normalized and
  (3) a function ensuring against excess speeds can be put to practical use and
  (4) the resolution of commands can be made the same for motors of both large and small output.

In addition, since the apparatus can be constructed by arranging the amplifier on a single circuit chip, mass productivity can be enhanced and cost reduced. It is also easy to replace the amplifier should the amplifier malfunction.

DETAILED DESCRIPTION OF THE PREFERRED EMBODIMENTS

An embodiment of the present invention will now be described in detail with reference to the drawings.

Figure 1:
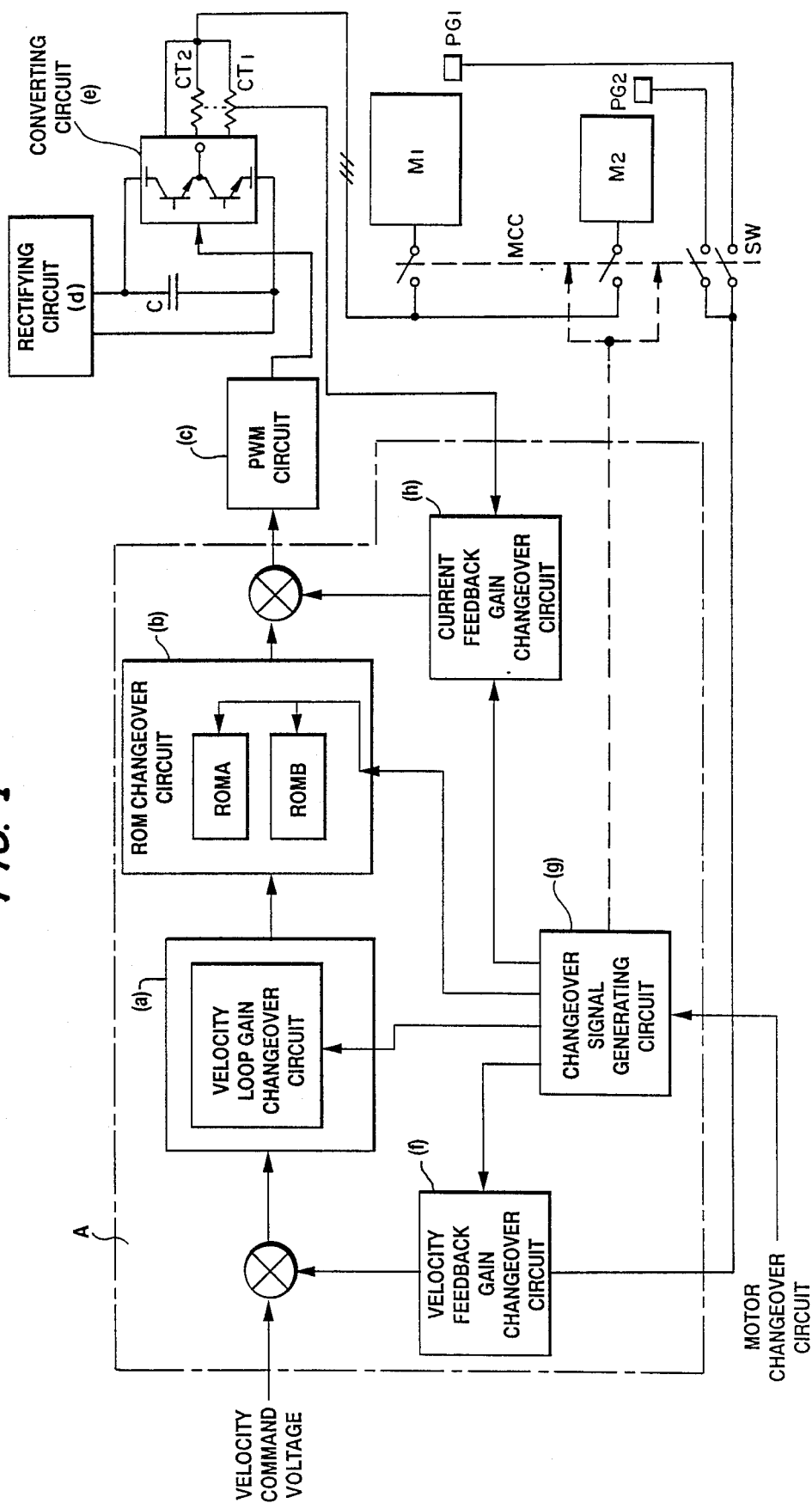
FIG. 1 is a block diagram illustrating an embodiment of the present invention.

FIG. 1 is a block diagram illustrating an embodiment of a motor velocity control apparatus according to the present invention.

In the FIGURE, spindle drive motors $M_1$, $M_2$ are for a machine tool, or the like. It is assumed that a first motor is characterized by a higher output or higher rotational velocity in comparison with a second motor, which is characterized by a different output or velocity. These motors are driven by a converting circuit (e) including a transistor inverter, or the like, controlled by an output signal from a PWM circuit (c). The supply of power to the converting circuit (e) is performed by a rectifying circuit (d) connected to a three-phase AC power supply R, S, T.

The rotational velocities of the motors $M_1$, $M_2$ are sensed by pulse generators $PG_1$, $PG_2$, which apply signals indicative of the sensed velocities to a velocity feedback gain changeover circuit (f). Also provided are a velocity loop gain changeover circuit (a) and a ROM changeover circuit (b) having a changeover circuit of a current loop amplitude and phase table storage circuit. The ROM changeover circuit (b) is provided with a plurality of memories. For example, the characteristics of the motor $M_1$ are stored in a ROM A, and the characteristics of the motor $M_2$ are stored in a ROM B.

The operation of this motor velocity control apparatus will now be described. When a motor changeover signal enters a changeover signal generation circuit (g), a signal from one of the pulse generators $PG_1$, $PG_2$ is applied to the velocity feedback gain changeover circuit (f), this being decided by whether e.g., the high-velocity motor $M_1$ or low-velocity motor $M_2$ is selected. Next, the gain of the velocity loop gain changeover circuit (a) is changed over in dependence upon the selection made by the velocity feedback gain changeover circuit (f). Further, ROM A or ROM B is selected depending on which of the motors $M_1$, $M_2$ has been chosen, and the amplitude and phase of the current loop are decided. The pulse width of the PWM circuit (c) is decided by a current feedback gain changeover circuit (h). The output signal of the PWM circuit (c) controls the conductance of the converting circuit (e) composed of the transistor inverter, or the like, thereby controlling each of the motors $M_1$, $M_2$.

Figure 2:
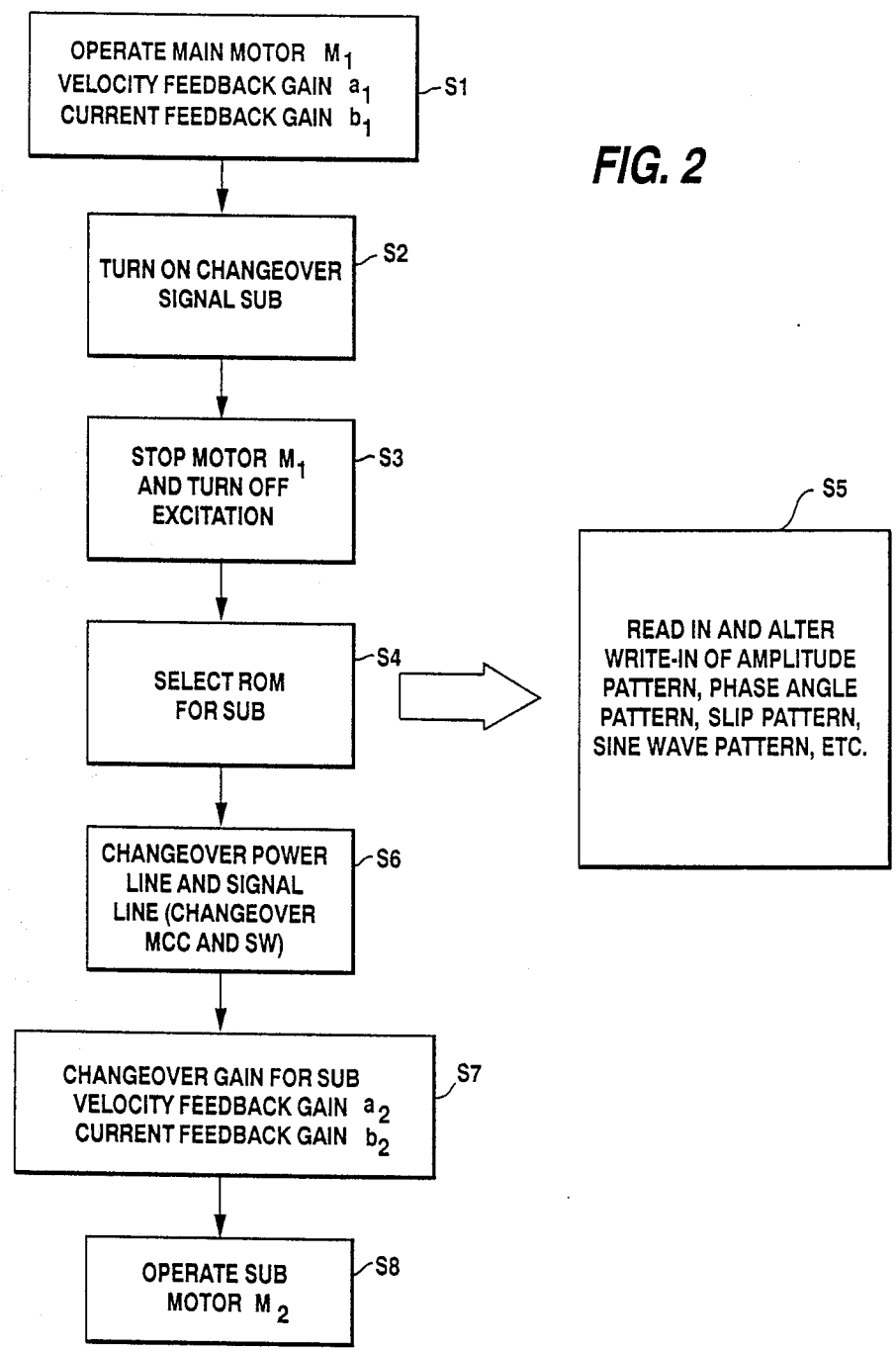
FIG. 2 is a flowchart illustrating an operation sequence of the present invention.

The operation of the motor velocity control apparatus will now be described in further detail using the flowchart of FIG. 2 and the changeover signal generating circuit (g), current feedback gain changeover circuit (h) and velocity feedback gain changeover circuit (f) illustrated in detail in FIGS. 3, 4 and 5, respectively.

Figure 3:
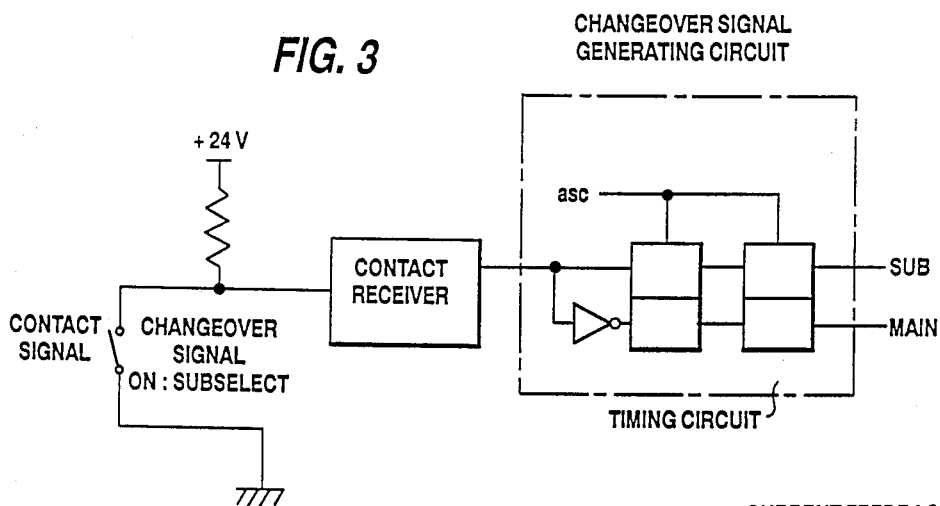
FIG. 3 is a schematic diagram of a changeover signal generating circuit.
Figure 4:
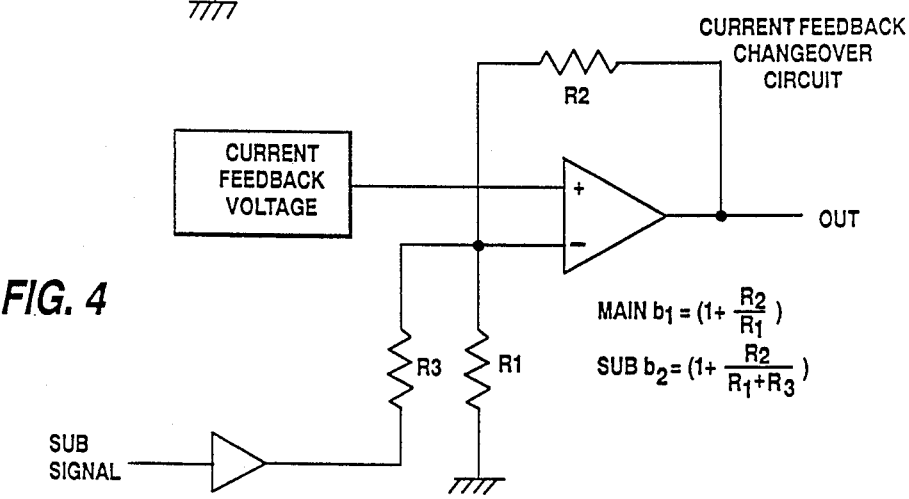
FIG. 4 is a schematic diagram of a current feedback gain changeover circuit.
Figure 5:
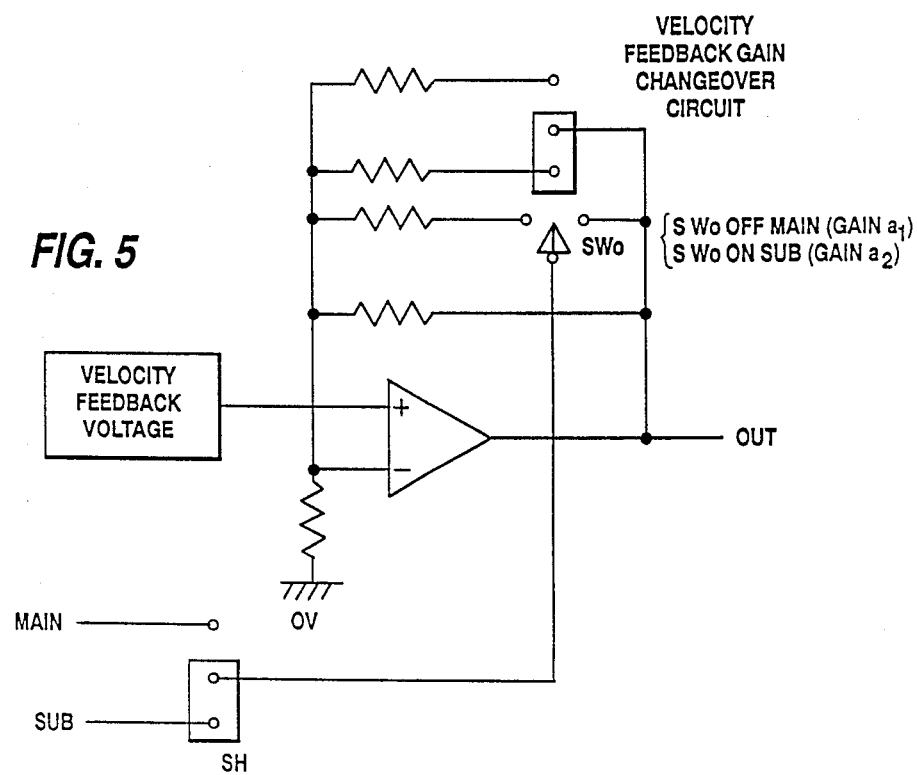
FIG. 5 is a schematic diagram of a velocity feedback gain changeover circuit.

Initially, it is assumed that the changeover signal in FIG. 3 is off, a switch $SW_o$ in FIG. 5 is off, and that the main motor $M_1$ is operating with a velocity feedback gain $a_1$ (FIG. 5) and a current feedback gain $b_1$ (FIG. 4) (step $S_1$).

Next, the changeover signal in FIG. 3 is turned on to select sub operation (step $S_2$) and motor $M_1$ is stopped and excitation is turned off (step $S_3$).

In the following step, a ROM for sub is selected (step $S_4$), and the contents of a ROM, such as an amplitude pattern, phase angle pattern, slip pattern and sine wave pattern, are rewritten (step $S_5$).

Further, the power line and signal line are changed over (contacts MCC, SW in FIG. 1 are changed over) (step $S_6$).

Finally in accordance with FIGS. 4 and 5, the velocity feedback gain is changed over to $a_2$, the current feedback gain is changed over to $b_2$ (step $S_7$), and the motor $M_2$ for sub is run (step $S_8$).

In the above embodiment of the velocity control apparatus, two differently rated motors $M_1$, $M_2$ are controlled by a changeover operation within a single servoamplifier. However, the gain of each characteristic of the servoamplifier can be set at will. By being able to set the constants of each of the circuits provided in the hardware of one and the same servoamplifier, it is possible to construct servoamplifiers corresponding to respective ones of the motors having different ratings. In such an embodiment, the portion A in FIG. 1 enclosed by the one-dot chain line can be composed of the same hardware. This enables cost to be reduced by mass production. Another advantage peculiar to this embodiment is that the servoamplifier can be replaced in a simple manner if it should malfunction.

According to the motor velocity control apparatus of the present invention, a single servoamplifier adjusted so as to conform to the characteristics of each motor is changed over and connected when controlling a plurality of motors which differ in terms of characteristics and performance. Therefore, in a case where plural motors having different characteristics so that they can operate as high-output and low-output motors or as high-velocity and low-velocity motors are used in a machine tool, or the like, such as a machining center, the hardware of a single servoamplifier can be shared by each of the motors to enable a reduction in cost and more efficient utilization.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims.

We claim:

1. A motor velocity control apparatus for feedback control, comprising:
    a plurality of motors having different operating characteristics based on a velocity command voltage; and
    a servoamplifier capable of controlling the motors by changing over gain of feedback signals from the motors to adjust and amplify the velocity command voltage, said servo amplifier including:
        a changeover signal generating circuit for changing over and controlling said servoamplifier by a motor changeover signal;
        a current feedback gain changeover circuit, connected to said changeover signal generating circuit, for changing over the feedback gain of an input current to each of the motors;
        a velocity feedback gain changeover circuit, connected to said changeover signal generating circuit, for changing over the feedback gain of a rotational velocity signal of each of the motors;
        a velocity loop gain changeover circuit, connected to said changeover signal generating circuit and said velocity feedback gain changeover circuit, for changing over a velocity loop gain of each of the motors; and
        changeover circuit means, connected to said velocity loop gain changeover circuit and said changeover signal generating circuit, including a phase table storage circuit, for determining the amplitude and phase of a current loop gain based upon values input from the phase table storage circuit.

2. A motor velocity control apparatus according to claim 1, wherein the servoamplifier further comprises:
    connecting means for selectively connecting the plural motors to said servoamplifier by the motor changeover signal.

3. A motor velocity control apparatus for feedback control of plural types of spindle motors having different operating characteristics based on a velocity command voltage, comprising:
    a servoamplifier capable of controlling the plural types of motors by changing over a gain of feedback signals from the motors to adjust and amplify said velocity command voltage, said servoamplifier including:
        means for changing over the feedback gain of an input current to each of the motors;
        means, coupled to the motors, for changing over the feedback gain of an rotational velocity signal of each of the motors;
        means, coupled to said means for changing over the feedback gain of rotational velocity signal, for changing over a velocity loop gain of each of the motors; and
        changeover circuit means, connected to said means for changing over the velocity loop gain, for determining the amplitude and phase of a current loop gain based upon values input from a phase table storage circuit; and
    a changeover signal generating circuit, connected to said means for changing over the feedback gain of the input current, said means for changing over the feedback gain of the rotational velocity signal, and said changeover circuit means, for changing over and controlling said servoamplifier by a motor changeover signal.

4. A motor velocity control apparatus according to claim 3, wherein said servoamplifier further comprises:
    connecting means for selectively connecting the plural spindle motors to said servoamplifier by the motor changeover signal.

* * * * *